(12) United States Patent
Yabuzaki

(10) Patent No.: US 7,564,228 B2
(45) Date of Patent: Jul. 21, 2009

(54) SWITCHING REGULATOR

(75) Inventor: Jun Yabuzaki, Nagano (JP)

(73) Assignee: Fuji Electronic Device Technology Co., Ltd., Tokyo (JP)

( * ) Notice: Subject to any disclaimer, the term of this patent is extended or adjusted under 35 U.S.C. 154(b) by 125 days.

(21) Appl. No.: 11/898,044

(22) Filed: Sep. 7, 2007

(65) Prior Publication Data

US 2008/0067988 A1 Mar. 20, 2008

(30) Foreign Application Priority Data

Sep. 15, 2006 (JP) ............................. 2006-251464

(51) Int. Cl.
*G05F 1/575* (2006.01)
*G05F 1/618* (2006.01)

(52) U.S. Cl. ...................... 323/258; 323/284

(58) Field of Classification Search ................. 323/224, 323/247, 255, 258, 282, 284, 328, 240, 343
See application file for complete search history.

(56) References Cited

U.S. PATENT DOCUMENTS 6,100,675 A 8/2000 Sudo et al.
6,188,209 B1 * 2/2001 Poon et al. .................. 323/255
7,061,213 B2 6/2006 Yoshida et al.
7,382,115 B2 * 6/2008 Woo ........................... 323/282

FOREIGN PATENT DOCUMENTS

JP 11-155281 6/1999
JP 2004-096982 3/2004

* cited by examiner

*Primary Examiner*—Gary L Laxton
(74) *Attorney, Agent, or Firm*—Rabin & Berdo, PC (57) ABSTRACT

In a switching regulator, an inductor L1 (in FIG. 1) and an output capacitor C1 are connected on the output side of a series circuit consisting of a switching element (MOS transistor P1) and a synchronous rectification element (MOS transistor N1), and an N-channel MOS transistor Q1 is connected between an intermediate point of the inductor L1 and one terminal thereof. In addition, the frequency of oscillator 2 and the turning ON/OFF of MOS transistor Q1 are controlled by control unit 1. When output voltage Vout is to be altered, the switching frequency of MOS transistors P1 and N1 is increased, and the inductance of inductor L1 is reduced, whereby a fast output change is permitted. On the other hand, during ordinary constant output voltage operation, the switching frequency is reduced, and the inductance value is increased, whereby high efficiency is attained.

7 Claims, 8 Drawing Sheets

SWITCHING REGULATOR

BACKGROUND OF THE INVENTION

1. Field of the Invention

The present invention relates to a switching regulator wherein an inputted DC current is turned ON/OFF by a switching element in such a way that an output voltage is controlled. More particularly, it relates to a switching regulator that is configured as a DC/DC converter.

2. Description of the Related Art

Switching regulators controlled by a power source controlling IC are extensively utilized as small power sources, and as DC/DC converters. Such a switching regulator includes a switching element, which turns an inputted DC current ON and OFF, as well as an inductor and a capacitor, which are disposed on the output side of the switching element. A MOSFET, for example, may be employed as the switching element, and controlled by PWM (Pulse Width Modulation).

The switching regulator as described above can alter an output voltage in accordance with an external input signal. In the prior art, in order to vary the output voltage rapidly, the inductance value of the inductor is kept low, and the switching frequency of the switching element is set to be high. Therefore, when a predetermined voltage is to be outputted, the switching frequency sometimes becomes unnecessarily high, which reduces efficiency. When, in order to heighten the efficiency at the output of the predetermined voltage, the inductance value is made high, and the switching frequency is set to be low, changes in output are slowed down.

Figure 8A:
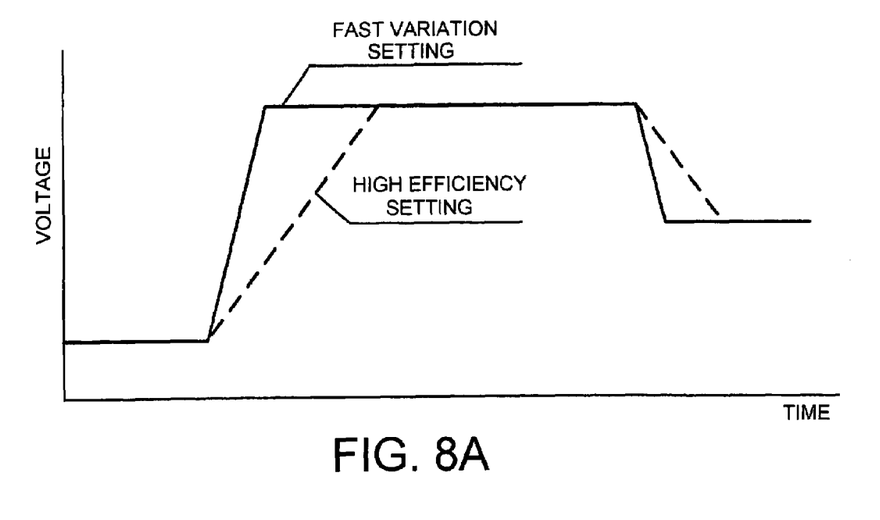
FIGS. 8A and 8B are diagrams showing relationships between output voltage and efficiency in a prior-art switching regulator.
Figure 8B:
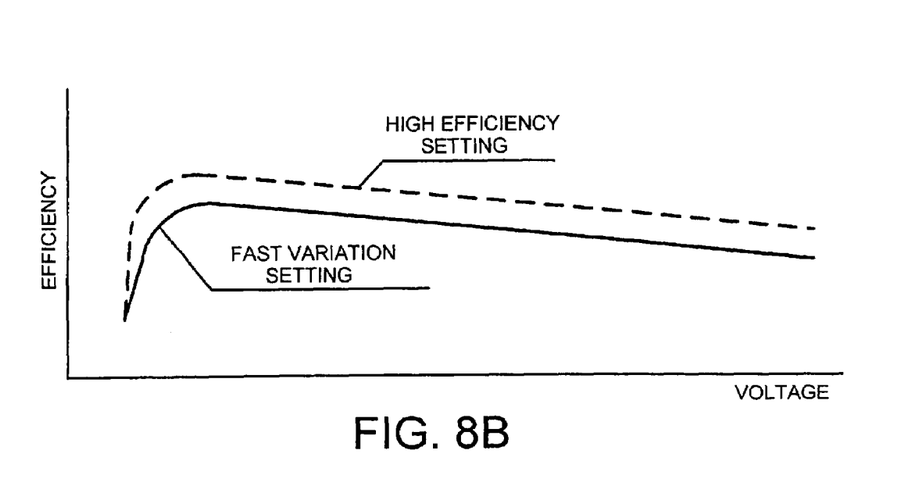

FIGS. 8A and 8B are diagrams showing relationships between output voltage and efficiency in the prior-art switching regulator as stated above. More specifically, FIG. 8A shows output waveforms including output voltage variations, and the solid line indicates the output voltage in the fast output variation setting, while the broken line indicates the output voltage in the setting where more importance is attached to the efficiency. FIG. 8B shows the efficiencies of each setting for a constant output voltage, where the solid line indicates the efficiency in the fast output variation setting, while the broken line indicates the efficiency in the setting where more importance is attached to the efficiency. As described above, when the output voltage is to be varied rapidly, the efficiency is reduced, and when more importance is to be attached to efficiency, the output change becomes slowed down.

A switching regulator that enhances efficiency at light loads has been proposed (refer to, for example, JP 11-155281 A, which corresponds to U.S. Pat. No. 6,100,675). The switching regulator changes over its switching frequency between light loads and ordinary loads. By way of example, the switching frequency may be set at 100 kHz for light loads and at 500 kHz for ordinary loads, but other values are of course possible without departing from the scope of the invention.

In addition, a switching regulator that can attain high efficiency in a wide frequency region has been proposed (refer to, for example, JP 2004-096982 A, which corresponds to U.S. Pat. No. 7,061,213). The switching regulator performs PFM (Pulse Frequency Modulation) control at light loads, and it changes-over from PFM control to PWM control at heavy loads or upon alteration of the output voltage.

In the prior-art switching regulator described above, however, the inductance value of the inductor is fixed. This poses the problem that, when the inductance value is set to adapt to rapid output changes, the switching frequency becomes unnecessarily high and efficiency is reduced, at the output of the predetermined voltage, and that, when the efficiency at a constant output voltage is set high, the switching frequency is reduced, which slows down changes in the output voltage.

Further, in the system wherein the switching frequency is changed over between light loads and ordinary loads, when a response in the case of changing over the output voltage from a low voltage to a high voltage is to be speeded up for ordinary loads, the switching frequency needs to be further increased. Moreover, the inductor on this occasion needs to transiently feed a charging current for raising the voltage of the output capacitor, in addition to feeding the current to the load. In this regard, especially at a heavy load, the inductor current is used to feed the load even when the ON-time ratio of the switching element is at the maximum, so that charging the output capacitor becomes slow or becomes impossible. Since the inductor is set at a value enhancing the efficiency in ordinary operation, the response cannot be speeded up by causing the current to flow in excess in such a transient response mode.

Further, in the system wherein the type of control is changed over between light and heavy loads or upon the alteration of the output voltage, high efficiency can be attained over a wide frequency region. It is necessary, however, to provide control circuits for the two feedback loops for PFM control and PWM control. Accordingly, a complicated circuit configuration is required, and current dissipation is increased. Moreover, in the same manner as in the preceding system, the inductor is set at a value enhancing the efficiency in ordinary operation, and hence, the response cannot be speeded up by causing a current to flow in excess in a transient response mode.

SUMMARY OF THE INVENTION

The present invention has been made in view of such drawbacks of the prior art, and it has for its object to provide a switching regulator that can change output voltage rapidly without reducing efficiency, and by employing a simple circuit configuration.

In order to accomplish the above object, the invention provides a switching regulator wherein an inputted DC current is turned ON and OFF by a switching element so as to control an output voltage, including a driver which drives the switching element using pulse width modulation, and an inductor of variable inductance value, which is connected on an output side of the switching element, where, when the output voltage is to be altered, the switching frequency of the switching element and the inductance value of the inductor are changed.

According to such a switching regulator, when the output voltage is to be altered, the switching frequency of the switching element and the inductance value of the inductor can be changed over. That is to say that the inductance is reduced and the switching frequency is increased. Therefore, a fast output change is permitted without reducing efficiency, by employing a simple circuit configuration.

When the output voltage is to be altered, the switching frequency of the switching element and the inductance value of the inductor can be changed over, and hence, the switching regulator of the invention has the advantage that fast output changes are permitted without reducing efficiency, by employing a simple circuit configuration.

DESCRIPTION OF THE PREFERRED EMBODIMENTS

Now, embodiments of the present invention will be described with reference to the drawings.

Figure 1:
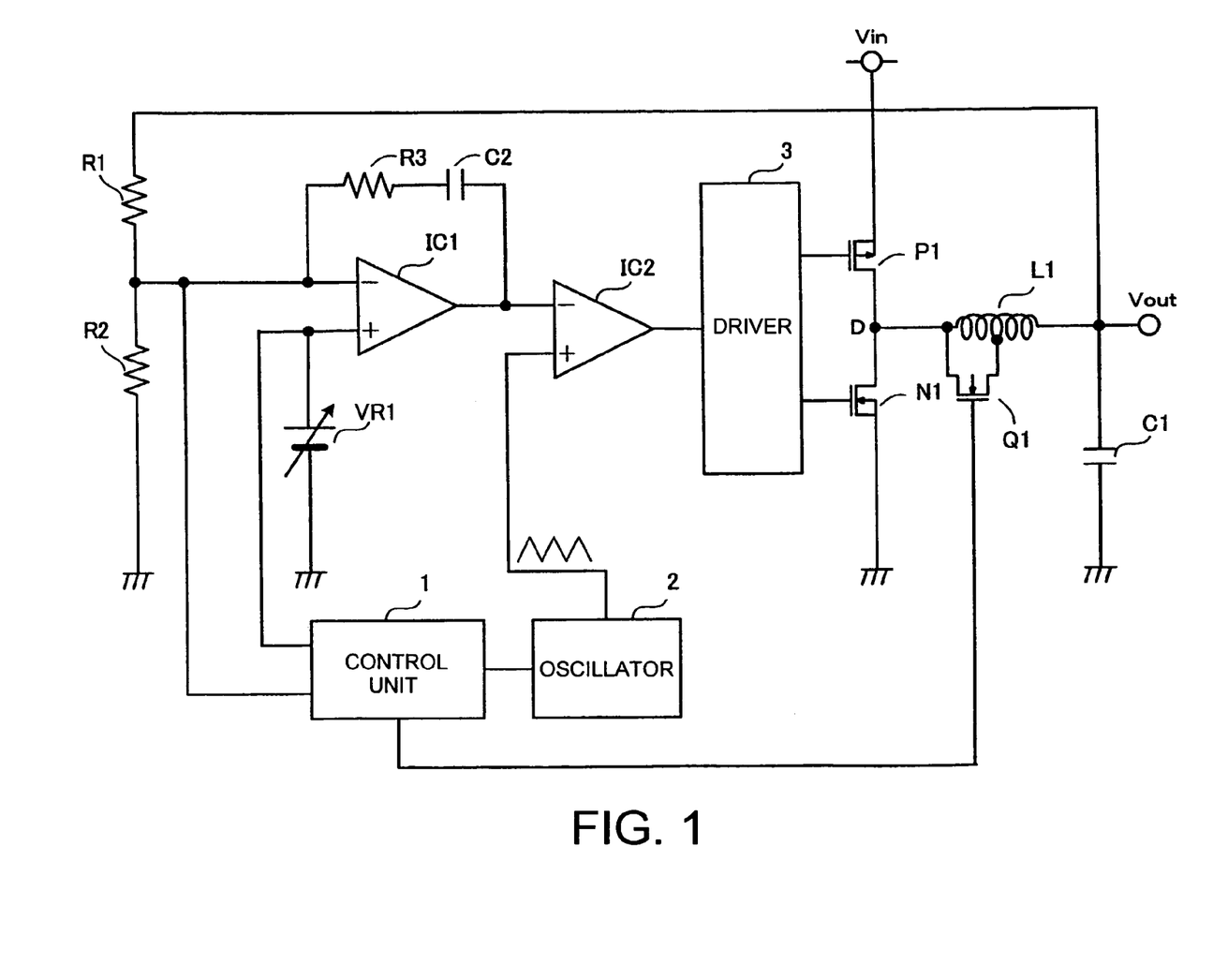
FIG. 1 is a circuit diagram showing a configuration of a switching regulator in a first preferred embodiment of the present invention.

FIG. 1 is a circuit diagram showing a configuration of a switching regulator in a first preferred embodiment of the invention. The switching regulator is configured as a step-down type DC/DC converter with a PWM control system. It includes a series circuit which consists of a P-channel MOS transistor P1 as a switching element that turns ON and OFF a DC current from a voltage source for feeding an input voltage Vin, and an N-channel MOS transistor N1 as a synchronous rectification element, an inductor L1 which is connected to a point D on the output side of the series circuit, and an output capacitor C1. The inductor L1 has a an N-channel MOS transistor Q1 connected as a switch element between an intermediate point and one terminal thereof, and the inductance value thereof is variable by turning the MOS transistor Q1 ON and OFF. Turning the MOS transistor Q1 ON and OFF is controlled by a control signal from a control unit 1. Of course, the MOS transistor Q1 may just as well be connected between the intermediate point of the inductor L1 and the other terminal thereof on the output terminal side of the inductor L1 without departing from the scope of the invention.

An output voltage Vout which is fed to a load (not shown) through the inductor L1 as well as being present across the output capacitor C1 is divided by resistors R1 and R2 which are connected in series. A voltage at the node of the resistors R1 and R2 is inputted to an error amplifier IC1 as a detection voltage, and the error of the detection voltage relative to a reference voltage from a voltage source VR1 whose output is variable is amplified by the error amplifier IC1. A series circuit that consists of a resistor R3 and a capacitor C2 is connected between the inverting input terminal (−) and output terminal of the error amplifier IC1.

The output of the error amplifier IC1 is inputted to a PWM comparator IC2 and is compared with a triangular wave signal from an oscillator 2, whereby the duty of a PWM control is determined. A driver 3 outputs drive signals of the predetermined duty to the MOS transistor P1 and the MOS transistor N1, so as to PWM-drive the MOS transistors P1 and N1.

The switching regulator configured as described above can alter the output voltage Vout according to the value of an external signal. When the output voltage Vout is to be altered, the switching frequency of the MOS transistors P1 and N1 and the inductance value L of the inductor L1 are changed-over. That is, the inductance value L of the inductor L1 can be varied depending upon the operating condition of the load. The detection voltage of the output and the reference voltage are inputted to the control unit 1, so that the oscillation frequency of the oscillator, 2 can be changed over to a value adapted for the inductance value L.

In the circuit of FIG. 1, the output voltage Vout at the time of starting is 0 V. at this time, the control unit 1 judges that the output voltage Vout has not arrived at a set value, and it sets the control signal at a "high" level. When the control signal becomes high, the MOS transistor Q1 turns ON, and the inductance value L of the inductor L1 becomes small. At the same time, a high oscillation frequency f that has been set at the small inductance value L is generated by the oscillator 2, and the output voltage Vout is changed quickly employing the small inductance value L and the high oscillation frequency f until the output voltage Vout arrives at the set value.

Upon judging that the output voltage Vout has arrived at the set value, the control unit 1 sets the control signal at a "low" level. When the control signal becomes low, the MOS transistor Q1 turns OFF, and the inductance value L of the inductor L1 becomes large. Simultaneously, the oscillation frequency f is lowered in adaptation to the large inductance value L, whereby high efficiency operation is attained.

Figure 2:
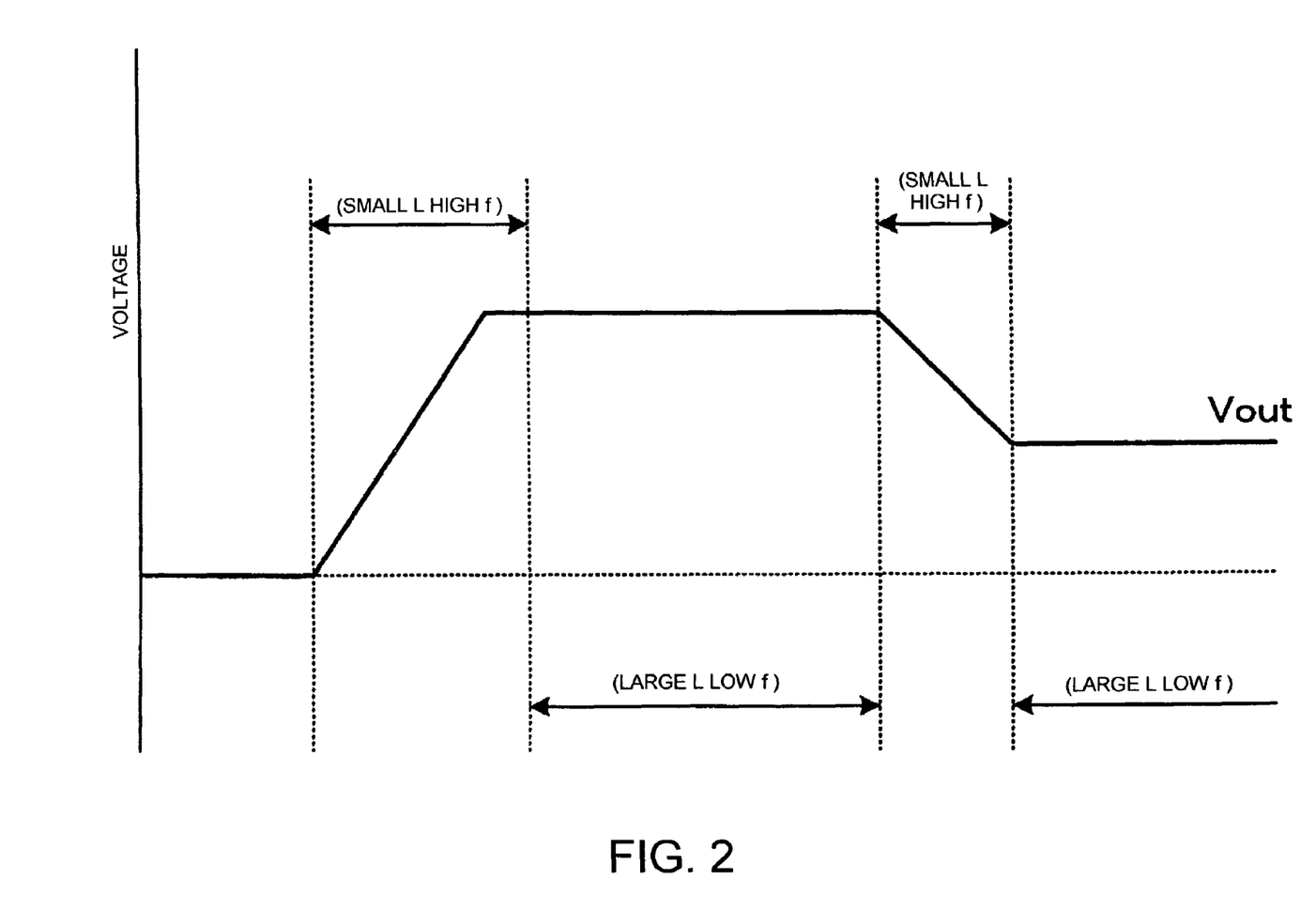
FIG. 2 is a diagram showing an output voltage waveform of a switching regulator in a preferred embodiment of the invention.

FIG. 2 is a diagram showing an output voltage waveform in a switching regulator in a preferred embodiment. When the output voltage Vout is to be increased at the time of starting, the inductance value L is made small and the oscillation frequency f is made high (small L and high f), whereby fast variations are permitted. When a predetermined output voltage has been reached, the inductance value L is made large and the oscillation frequency f is made low (large L and low f), whereby high efficiency operation is attained. When the output voltage Vout is to be lowered, control is similar to that when starting. The control unit 1 performs a fast variation operation upon judging that the output voltage Vout has not reached the set value, and it performs a high efficiency operation when the output of predetermined voltage has been reached.

In this manner, when the output voltage Vout is to be altered, the switching frequency of the MOS transistors P1 and N1 and the inductance value L of the inductor L1 can be changed over, so that a fast output change is permitted without reducing efficiency, using a simple circuit configuration.

Figure 3:
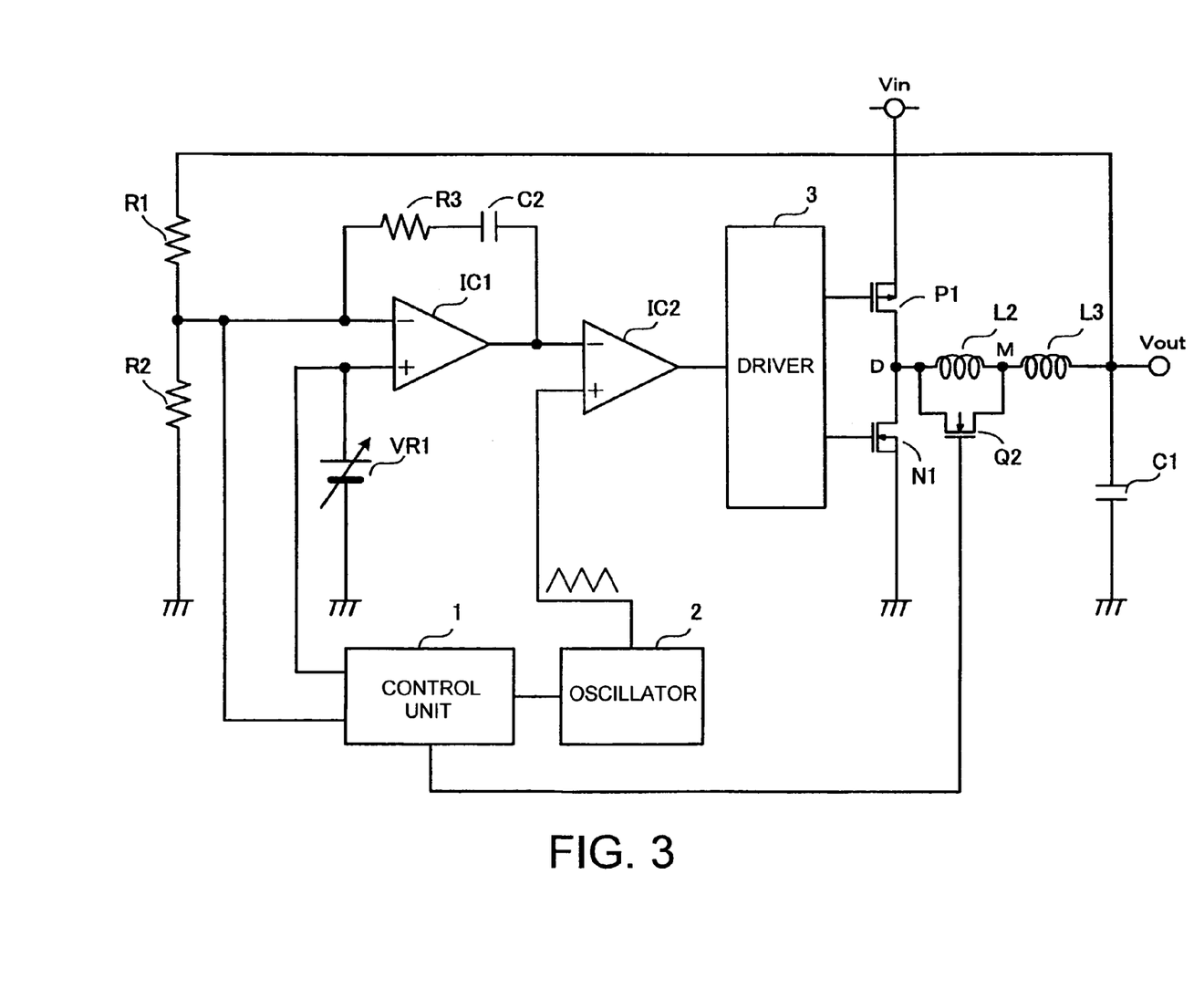
FIG. 3 is a circuit diagram showing a configuration of a switching regulator in a second preferred embodiment of the invention.

FIG. 3 is a circuit diagram which shows the configuration of a switching regulator in the second preferred embodiment of the invention, and in which the same numerals and signs as in FIG. 1 indicate the same elements. In the second embodiment, the inductor consists of two inductance elements L2 and L3 connected in series, and an N-channel MOS transistor Q2 is connected as a switching element between a point M being a node connecting the two inductance elements L2 and L3 and the terminal of one inductance element L2 on the side of point D. The other configuration is the same as in the switching regulator in the first embodiment shown in FIG. 1.

In the switching regulator configured as described above, turning the MOS transistor Q2 ON and OFF is con-trolled by a control signal from a control unit 1, whereby the inductance value L of the inductor can be changed over. Accordingly, in the same manner as in the switching regulator of the first embodiment, the switching frequency of MOS transistors P1 and N and the inductance value L of the inductor can be changed over when an output voltage Vout is to be altered, so that a fast output change is permitted without lowering efficiency, using a simple circuit configuration.

In the circuit of FIG. 3, a high-voltage sometimes appears on account of a resonance that occurs at the point M being the node between the inductance elements L2 and L3 the moment the MOS transistor Q2 is changed over from "ON" to "OFF". Therefore, the MOS transistor Q2 needs to be a transistor with a high withstand voltage. Likewise, also the MOS transistor Q1 in the circuit of FIG. 1 needs to be a transistor with a high withstand voltage.

Figure 4:
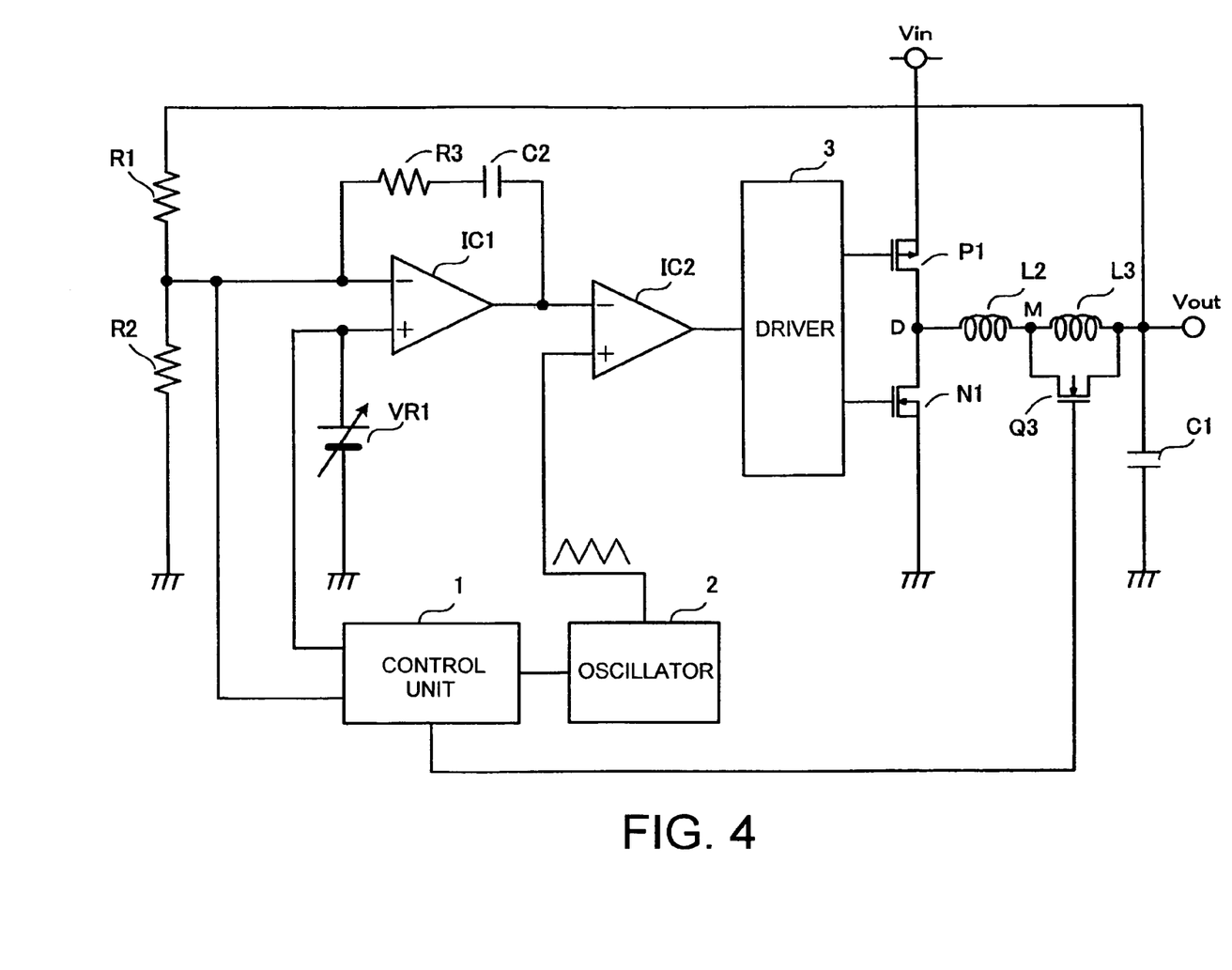
FIG. 4 is a circuit diagram showing a configuration of a switching regulator in a third preferred embodiment of the invention.

FIG. 4 is a circuit diagram which shows the configuration of a switching regulator in the third preferred embodiment of the invention, and in which the same numerals and signs as in FIG. 3 indicate the same elements. In the third embodiment, the inductor consists of two inductance elements L2 and L3 connected in series, and an N-channel MOS transistor Q3 is connected as a switching element between a point M being the node between the two inductance elements L2 and L3 and the terminal of one inductance element L3 on the side of an output terminal. Also the MOS transistor Q3 needs to be a transistor having a high withstand voltage as does the MOS transistor Q2 in FIG. 3. The other configuration is the same as in the switching regulator in the second embodiment shown in FIG. 3.

Also, in the switching regulator configured as described above, as in the foregoing, turning the MOS transistor Q3 ON and OFF is controlled by a control signal from a control unit 1, whereby the inductance value L of the inductor can be changed over. Accordingly, in the same manner as in the switching regulator of the first or second embodiment, the switching frequency of MOS transistors P1 and N1 and the inductance value L of the inductor can be changed over when an output voltage Vout is to be altered, so that a fast output change is permitted without lowering efficiency, using a simple circuit configuration.

Figure 5:
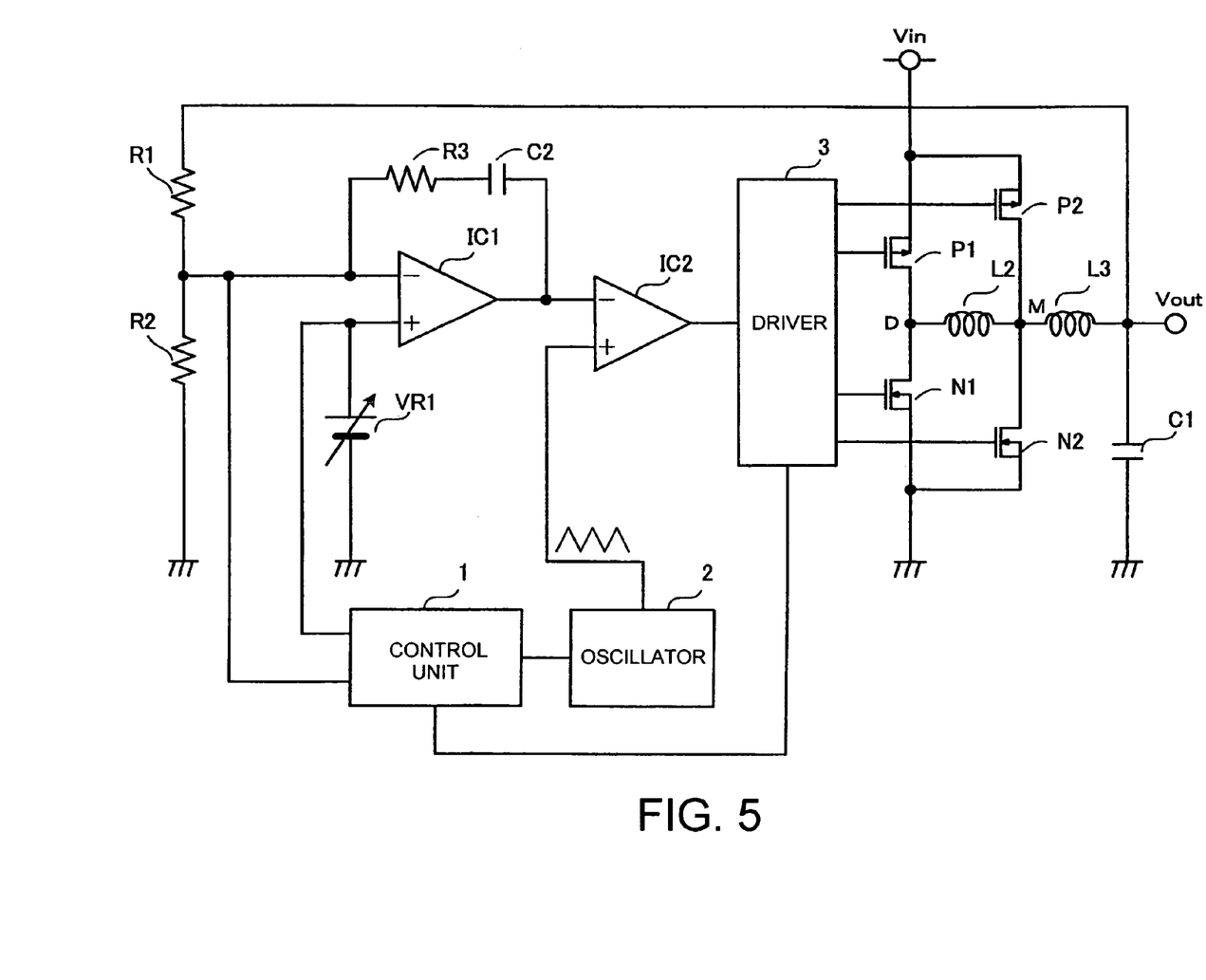
FIG. 5 is a circuit diagram showing a configuration of a switching regulator in a fourth preferred embodiment of the invention.

FIG. 5 is a circuit diagram showing the configuration of a switching regulator in the fourth preferred embodiment of the invention. In the fourth embodiment, in the same manner as in the second or third embodiment, the inductor consists of two inductance elements L2 and L3 connected in series. However, in addition to not only a MOS transistor P1 which is a switching element, and a MOS transistor N1 which is a synchronous rectification element, the MOS transistors P1 and N1 forming a loop, a P-channel MOS transistor P2 is also provided as a switching element, as well as an N-channel MOS transistor N2 as a synchronous rectification element, the MOS transistors P2 and N2 forming another loop. The source terminals of the MOS transistors P2 and N2 are respectively connected in common to the source terminals of the MOS transistors P1 and N1, while the drain terminals of the MOS transistors P2 and N2 are both connected to a point M which is the node between the two inductance elements L2 and L3. The turning ON and OFF operations of the switching elements and synchronous rectification elements of the two loops are controlled through a driver 3, whereby the inductance value L of the inductor is changed over.

In the switching regulator of the fourth embodiment, the inductance value L of the inductor is made small in such a way that the switching element and the synchronous rectification element are respectively changed over from the MOS transistors P1 and N1 to the MOS transistors P2 and N2, instead of short-circuiting either of the two inductance elements L2 and L3 by the MOS transistor Q2 or Q3 as in the second or third embodiment. At that time, operations of the MOS transistors P1 and N1 that have been changed over are stopped. Further, when the switching regulator has entered an output operation of predetermined voltage, it stops the operation of the MOS transistors P2 and N2, and it returns to the operation of the MOS transistors P1 and N1. The other operation is the same as in the second or third embodiment.

In the switching regulator thus configured, the driver 3 is controlled by a control signal from a control unit 1, whereby the inductance value L of the inductor can be changed over. Accordingly, in the same manner as in the switching regulator of each of the foregoing embodiments, the switching frequency and the inductance value L of the inductor can be changed over when an output voltage Vout is to be altered, so that a fast output change is permitted without lowering efficiency, using a simple circuit configuration.

Figure 6:
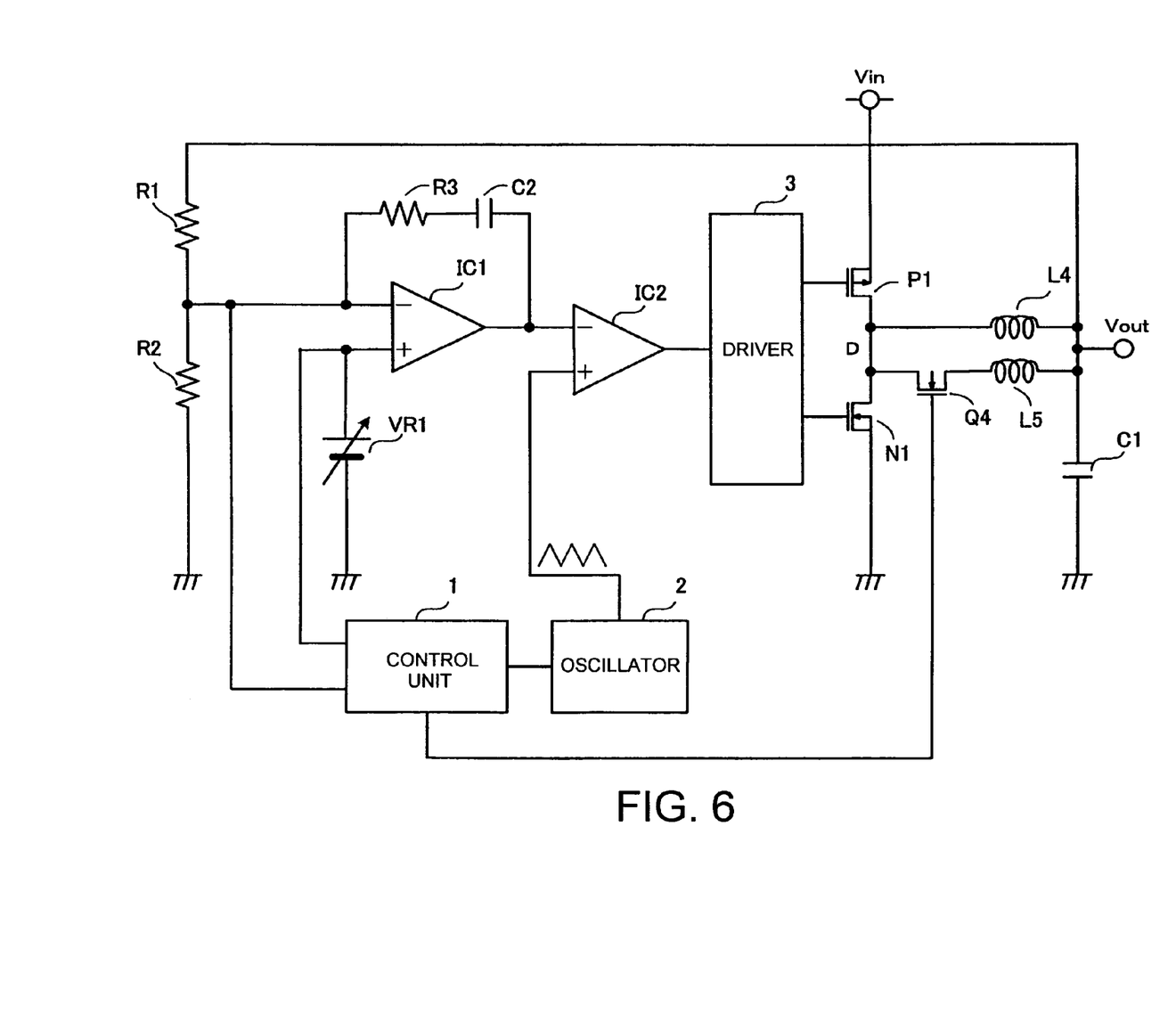
FIG. 6 is a circuit diagram showing a configuration of a switching regulator in a fifth preferred embodiment of the invention.

FIG. 6 is a circuit diagram showing the configuration of a switching regulator in the fifth preferred embodiment of the invention. In the fifth embodiment, an inductor consists of two inductance elements L4 and L5 connected in parallel. An N-channel MOS transistor Q4 is connected as a switching element in series with one inductance element L5. In this example, the MOS transistor Q4 is connected between the inductance element L5 and a point D which is the node between a MOS transistor P1 and a MOS transistor N1. The other configuration is the same as in the second embodiment shown in FIG. 3 or the third embodiment shown in FIG. 4.

In the switching regulator thus configured, turning the MOS transistor Q4 ON and OFF is controlled by a control signal from a control unit 1, whereby the inductance value L of the inductor can be changed over. At that time, when the MOS transistor Q4 is "ON", the inductor falls into a state where the inductance elements L4 and L5 are operatively connected in parallel, and when the MOS transistor Q4 is "OFF", the inductor falls into a state where the inductance element L5 is not operatively connected.

In addition, when an output voltage Vout is to be altered, the switching frequency of the MOS transistors P1 and N1 is raised, and the MOS transistor Q4 is turned ON, whereby a high current can be supplied. On the other hand, during an ordinary operation of constant output voltage, the MOS transistor Q4 is turned OFF, and the switching regulator can be operated only with the inductance element L4. Accordingly, in the same manner as in the switching regulator of each of the foregoing embodiments, the switching frequency and the inductance value L of the inductor can be changed over when the output voltage Vout is to be altered, so that a fast output change is permitted without lowering efficiency, using a simple circuit configuration.

In the circuit of FIG. 6, a high voltage may appear at the node between the MOS transistor Q4 and the inductance element L5 the moment the MOS transistor Q4 changes from "ON" to "OFF". Therefore, the MOS transistor Q4 needs to be a transistor having a high withstand voltage.

Figure 7:
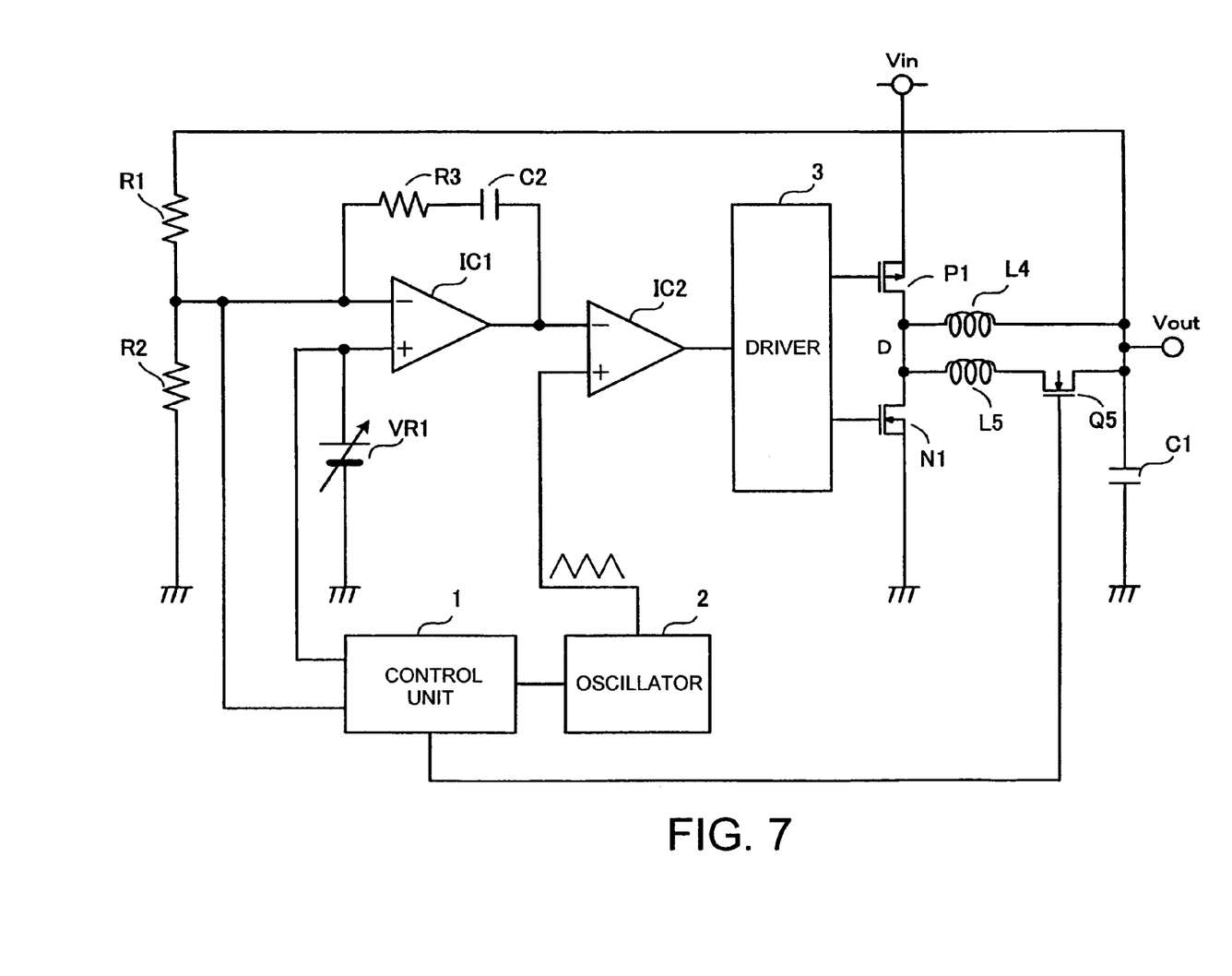
FIG. 7 is a circuit diagram showing a configuration of a switching regulator in a sixth preferred embodiment of the invention.

FIG. 7 is a circuit diagram which shows the configuration of a switching regulator in the sixth preferred embodiment of the invention, and in which the same numerals and signs as in FIG. 6 indicate the same constituents. In the sixth embodiment, the inductor consists of two inductance elements L4 and L5 connected in parallel, in the same manner as in the fifth embodiment, and an N-channel MOS transistor Q5 is connected as a switching element between the inductance element L5 and an output terminal. Also, the MOS transistor Q5 needs to be a transistor having a high withstand voltage, as does the MOS transistor Q4 shown in FIG. 6. The other configuration is the same as in the fifth embodiment shown in FIG. 6.

Also in the switching regulator thus configured, in the same manner as in the fifth embodiment, turning the MOS transistor Q5 ON and OFF is controlled by a control signal from a control unit 1, whereby the inductance value L of the inductor can be changed over. Accordingly, in the same manner as in the switching regulator of each of the foregoing embodiments, a switching frequency and the inductance value L of the inductor can be changed over when an output voltage Vout is to be altered, so that a fast output change is permitted without lowering efficiency, using a simple circuit configuration.

The circuits of FIGS. 1, 3, 4, 6 and 7 have been exemplified as employing the N-channel MOS transistors Q1-Q5 as the switch elements, respectively. These switch elements, however, may well be replaced with, for example, a transmission gate in which a P-channel MOS transistor is connected in parallel with each of the MOS transistors Q1-Q5.

Each of the foregoing embodiments has mentioned an example that is configured as a DC/DC converter of step-down type. However, the current of the inductor can be increased when the output voltage is to be raised, so that the invention is also applicable to a DC/DC converter of step-up type or step-up/down type.

Further, DC/DC converters of synchronous rectification type have thus far been described as the examples. However, the invention is also applicable to a DC/DC converter of asynchronous rectification type in which the N-channel MOS transistor N1 used as the synchronous rectification element is replaced with a commutation diode.

It will of course be realized by those skilled in the art that variations are possible and that the invention may be practiced otherwise than as specifically described herein without departing from the scope thereof.

What is claimed is:

1. A switching regulator wherein an inputted DC current is turned ON/OFF so as to control an output voltage, comprising:
    a first switching element that turns the inputted DC current ON/OFF;
    a driver that drives said the first switching element with a pulse width modulation signal; and
    an inductor of variable inductance value, which is connected on an output side of said first switching element;
    wherein, when the output voltage is to be altered, both a switching frequency of said first switching element and the variable inductance value of said inductor are changed.

2. The switching regulator according to claim 1, further comprising a second switching element which is connected between an intermediate point of said inductor and a terminal point of said inductor;
    wherein the variable inductance value of said inductor is changed by turning said second switching element ON or OFF.

3. The switching regulator according to claim 1, wherein:
    said inductor includes first and second inductance elements connected in series with each other; and
    said switching regulator further comprises a second switching element connected between a node joining said first and second inductance elements and a terminal point of one of said first and said second inductance elements remote from the node;
    wherein the inductance value of said inductor is changed by turning said second switching element ON or OFF.

4. The switching regulator according to claim 1, wherein:
    said inductor includes first and second inductance elements connected in parallel with each other; and
    said switching regulator further comprises a second switching element connected in series with one of said first and said second inductance elements;
    wherein the variable inductance value of said inductor is changed by turning said second switching element ON or OFF.

5. The switching regulator according to claim 1, wherein:
    said inductor includes first and second inductance elements connected in series with each other; and
    said switching regulator further comprises a second switching element, a first terminal of said second switching element connected to a terminal point of said first switching element that is not connected to said inductor, and a second terminal of said second switching element connected to a node between said first and second inductance elements;
    wherein the variable inductance value of said inductor is changed by controlling ON and OFF operations of said first and second switching elements through said driver.

6. The switching regulator according to claim 1, wherein said switching regulator is a DC/DC converter.

7. The switching regulator according to claim 6, wherein said switching regulator is a step-down converter.

* * * * *